(12) United States Patent
Crookes, Sr. et al.

(10) Patent No.: US 8,012,632 B2
(45) Date of Patent: Sep. 6, 2011

(54) MICROBIAL FUEL CELL AND METHOD OF USE (76) Inventors: Donald W Crookes, Sr., Attleboro, MA (US); Ciro DiMeglio, Redding, CT (US)

(*) Notice: Subject to any disclaimer, the term of this patent is extended or adjusted under 35 U.S.C. 154(b) by 0 days.

(21) Appl. No.: 12/478,721

(22) Filed: Jun. 4, 2009

(65) Prior Publication Data
US 2009/0305085 A1 Dec. 10, 2009

Related U.S. Application Data (60) Provisional application No. 61/058,667, filed on Jun. 4, 2008.

(51) Int. Cl.
*H01M 8/16* (2006.01)
*H01M 8/00* (2006.01)
*H01M 2/02* (2006.01)
*H01M 2/08* (2006.01)
*H01M 8/24* (2006.01)

(52) U.S. Cl. ............ 429/401; 429/2; 429/400; 429/443

(58) Field of Classification Search .............. 429/2, 401, 429/400, 443
See application file for complete search history.

(56) References Cited

U.S. PATENT DOCUMENTS

| 5,126,034 | A | 6/1992 | Carter et al. |
| 7,238,440 | B2 | 7/2007 | Damore et al. |
| 7,544,429 | B2 | 6/2009 | Kim et al. |
| 7,709,113 | B2 * | 5/2010 | Logan et al. ............... 429/2 |
| 2007/0134520 | A1 | 6/2007 | Shimomura et al. |
| 2009/0263700 | A1 | 10/2009 | Jiang et al. |

FOREIGN PATENT DOCUMENTS
WO 2008036347 A2 3/2008
* cited by examiner

*Primary Examiner* — Patrick Ryan
*Assistant Examiner* — Julian Mercado (57) ABSTRACT

A microbial fuel cell comprising a cathode module, an anode module, a means for feeding source water to the anode module, and a means for feeling air to the source water after said anode module, wherein the source water is introduced in the anode module and discharged at the cathode module, a membrane is not used to transfer electrons, and the source water does not flow through a layer between the cathode and anode modules, such as glass wool or beads.

9 Claims, 7 Drawing Sheets

MICROBIAL FUEL CELL AND METHOD OF USE

CROSS-REFERENCE TO RELATED APPLICATION

This application claims the benefit of the earlier filing date of U.S. Provisional Application No. 61/058,667, filed Jun. 4, 2008, which is incorporated herein by reference in its entirety.

TECHNICAL FIELD

The present invention relates to an improved membraneless and barrier-free microbial fuel cell for treating nutrient containing source water, such as wastewater.

The present invention is based on the technology of using a microbial fuel cell that converts chemical energy into electrical energy through the metabolism of microorganisms, in which the chemical energy is in the form of organic substances present in wastewater.

BACKGROUND

A microbial fuel cell or biological fuel cell is a bio-electrochemical system that drives a current by mimicking bacterial interactions found in nature. Micro-organisms catabolize compounds such as glucose, acetate, butyrate or wastewater and can generate electrons with source streams carrying catabolizable compounds, including those identified above. The electrons gained from this oxidation are transferred to an anode, where they depart through an electrical circuit before reaching the cathode. Here they are transferred to a high potential electron acceptor such as oxygen. As current flows over a potential difference, power is generated directly from biofuel by the catalytic activity of bacteria.

The microbial fuel cell is a device that converts chemical energy to electrical energy by the catalytic reaction of microorganisms. A typical microbial fuel cell consists of anode and cathode modules separated by a cation specific membrane. In the anode module, fuel is oxidized by microorganisms, generating electrons and protons. In typical microbial fuel cells, electrons are transferred to the cathode module through an external electric circuit, and the protons are transferred to the cathode module through the membrane. Electrons and protons are consumed in the cathode module, combining with oxygen to form water.

Most of the microbial cells are electrochemically inactive. The electron transfer from microbial cells to the electrode is facilitated by mediators such as thionine, methyl viologen, methyl blue, humic acid, neutral red and so on. Most of the mediators available are expensive and toxic. Some microbial fuel cells do not require a mediator but use electrochemically active bacteria to transfer electrons to the electrode (electrons are carried directly from the bacterial respiratory enzyme to the electrode). Among the electrochemically active bacteria are, *Shewanella putrefaciens, Aeromonas hydrophila*, and others. Bacteria in such MFCs typically have electrochemically-active redox enzymes such as cytochromes on their outer membrane that can transfer electrons to external materials.

When micro-organisms consume nutrients in source water in aerobic conditions they produce carbon dioxide and water. However when oxygen is not present they produce carbon dioxide, protons and electrons. One reaction that may occur is as follows:

$$C_{12}H_{22}O_{11} + 13H_2O \rightarrow 12CO_2 + 48H^+ + 48e^-$$

In fact, all biodegradable materials, such as proteins, fats and lipids, among others, are broken down to reaction products in the degradation process. These materials are all potential sources of energy through the present invention.

In order to generate a useful current it is necessary to create a complete circuit, not just shuttle electrons to a single point.

Microbial fuel cells ("MFC") have a number of potential uses. The first and most obvious is harvesting the electricity produced for a power source. Virtually any organic material could be used to 'feed' the fuel cell. Water used in various applications, such as food manufacturing and agriculture, create polluted waste streams. The organic matter from such streams can be used to feed the fuel cell. Manufacturers are required by regulation to clean such waste streams and current solutions have high capital costs, high operating costs, large spatial footprints, and large carbon footprints. Microbial fuel cells, such as the MFC described herein, could be installed to treat effluent from a number of processes that generate or discharge an effluent with a sufficient BOD, such as waste water treatment plants. The bacteria consumes nutrients from the water and produce power. The use of microbial fuel cells is a very clean and efficient method of energy production.

Since the power generated from a microbial fuel cell is directly proportional to the nutrient content of the source. The nutrient content of source water may be evaluated as biochemical oxygen demand ("BOD") values. A microbial fuel cell BOD sensor can be used to measure real time BOD values. An additional preferable benefit of a microbial fuel cell is the reduction of BOD from the influent to the effluent. Such measurements may indicate the efficacy of a cell.

In a microbial fuel cell, oxygen and nitrate are preferred electron acceptors and act through reduction of oxygen and nitrate to generate current. Most microorganisms have an outer cellular structure which shows strong non-conductivity. The typical microbial fuel cells the cathode module and the anode module are separated from each other with a membrane and current generation occurs in the anode module and a cation-exchange membrane is used to transfer protons from the anode module to the cathode module. In other microbial fuel cells a barrier is used and limitations have been found in the distance from the anode to the cathode.

The present inventors have also found that naturally occurring microorganisms found in source water streams, such as nutrient rich effluent streams (i.e., with sufficient BOD levels), can directly transfer electrons previously generated from oxidation of organic substances in an anode module and can be naturally cultured during the operation of a biofuel cell.

In previously developed microbial fuel cells, where the cathode module and anode module have been separated from each other, the generation and transfer of electrons and protons by means of bio-reaction in an anode module and the consumption of electrons and protons occurs by means of the following reaction:

$$4e^- + 4H^+ + O_2 \rightarrow 2H_2O$$

Typically, a circuit is formed across a membrane for operating microbial fuel cells for source water treatment in a continuous manner.

Thus, in the typical microbial fuel cell, a cation-exchange membrane has been used to transfer protons from the anode module to the cathode module. If microorganisms in an anode module are sufficiently cultured during the process, electrons and protons are generated from the oxidation of water nutrients, such as glucose or cellulose. Generated protons may be transferred via a cation-exchange membrane while electrons are transferred through an external electric coupling. In the cathode module the electrons and protons are consumed in a reduction process involving oxygen or nitrogen. In combination, the oxidation process in the anode and the reduction process in the cathode creates a potential difference and a current may be drawn through an external electrical coupling. Cation-exchange membranes, however, are subject to fouling, which reduces the efficiency of cation transfer across a cation-exchange membrane. Moreover, because the anode module is a closed chamber, fouling can cause a pH decrease in the anode module which could detrimentally affect the micro-organisms or require the use of a buffer solution. In addition to fouling problems, membranes are very expensive and introduce cost issues, particularly at higher throughputs.

As an alternative to the use of a membrane, US Published App. No. 20050208343 teaches using glass wool or glass beads as a barrier between the cathode and the anode. However, this negatively impacts the scalability of the microbial fuel cell and fouling will still impact performance of the microbial fuel cell. The published application also limits the distance between the anode and cathode, likely due to the use of such barriers. Such distance issues are overcome in the embodiments described herein which overcome these limitations and disadvantages, and the impact of these problems with a barrier free microbial fuel cell that uses flow to prevent backflow of oxygen to the cathode chamber.

SUMMARY

The embodiments described herein relate to a microbial fuel cell that overcomes the limitations and disadvantages described above by providing a membrane and barrier-free microbial fuel cell which lowers capital costs, cleans wastewater, and converts wastewater treatment into energy. In a preferred embodiment, the microbial fuel cell has an anode module containing an anode, a cathode module containing a cathode, and a source stream that contains sufficient nutrients to enable microorganisms in the source stream to grow a biofilm on fill that is contained in the anode module. Unlike typical membrane-using microbial fuel cells, the protons flow with the source stream to the cathode, where oxygen is introduced to the stream to produce an aerobic reaction. The flow prevents oxygen diffusion into the cathode chamber which maintains the anaerobic environment in the anode chamber. Optionally, a flow restrictor or backflow preventer may be used. In one embodiment, a flow restrictor may be used. In another embodiment a one-way valve may be used. In another embodiment, a unidirectional pump may be used.

A preferred embodiment described herein is to an improved barrier-free, membrane-free microbial fuel cell, which can be operated without using a cation-exchange membrane or any barrier between the cathode and the anode modules, such as glass wool or glass beads. The microbial fuel cell described herein allows for continuous flow, prevents fouling issues, and promotes scalability to fit the particular application. A membrane-less and barrier-free microbial fuel cell according to a preferred embodiment is an improved device capable of being utilized in a process of treating nutrient containing source water, such as food processing effluent or wastewater (sewage) with electricity generation.

As described above, the microbial fuel cell and other technology described herein is characterized by improving a microbial fuel cell to enable it to treat nutrient containing source stream, as measured by BOD levels, with a membraneless and barrier-free microbial fuel cell comprising a cathode module, an anode module, a means for feeding air to the cathode module, and a means for feeding source stream to the anode module.

Further, a membrane-less and barrier-free microbial fuel cell of the present invention is based on a novel and unique concept of first anaerobically treating the nutrient containing source water in an anode module and then aerobically treating the source stream from the anode module in a cathode module.

The membrane-less and barrier-free microbial fuel cell according to a preferred embodiment further does not require a particular distance between a cathode module and an anode module, and preferably uses a conductive, non-biocidal material, such as graphite as an electrode in the anode module and silver, silver coated, copper, copper coated, or a like conductive contact with biocidal or antibiotic properties as an electrode in the cathode module.

In another preferred embodiment, the fill that is used as the electrode in the anode module is derived from using a graphite foil that is wrapped around a neutral core rod, such as PVC. The graphite foil uses spacers to create gaps in each wrapped layer to allow the source stream to flow between each wrapped layer. The spacers can be configured to provide an optimal flow path for the source stream to maximize surface contact time with the electrode. In the cathode module the preferred fill is a conductive foil, most preferably with biocidal or antibiotic properties, such as silver. The silver coated foil is similarly wrapped using spacers to create a flow path between each wrapped layer of silver foil. The spacers may be smaller and the wrap may be tighter due to the water quality in the cathode module compared with the anode, namely, there will be less chance of plugging due to biofouling. It may also be preferably to arrange the spacers to achieve turbulent flow characteristics in the cathode module to inhibit biofilm formation.

Optionally, an alternative embodiment can use a buffer solution in an anode module in order to maintain the optimum pH for growth of microorganisms in the presence of organic acids generated when artificial wastewater is fed as a fuel so that the activity of microorganisms distributed in the anode module is kept constant.

BRIEF DESCRIPTION OF THE DRAWINGS

For a better understanding of the aforementioned aspects of the preferred embodiments as well as additional aspects and alternative embodiments thereof, reference should be made to the Detailed Description of Embodiments below, in conjunction with the following drawings.

DETAILED DESCRIPTION OF EMBODIMENTS

Membrane and barrier-free microbial fuel cells and methods of use are described herein. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, specific details are set forth to provide a thorough understanding of the described embodiments. However, it will be apparent to one of ordinary skill in the art that alternative embodiments may be practiced without these particular details. In other instances, methods, procedures, and components that are well-known to those of ordinary skill in the art are not described in detail to avoid obscuring aspects of the present embodiments of the inventions.

Figure 1:
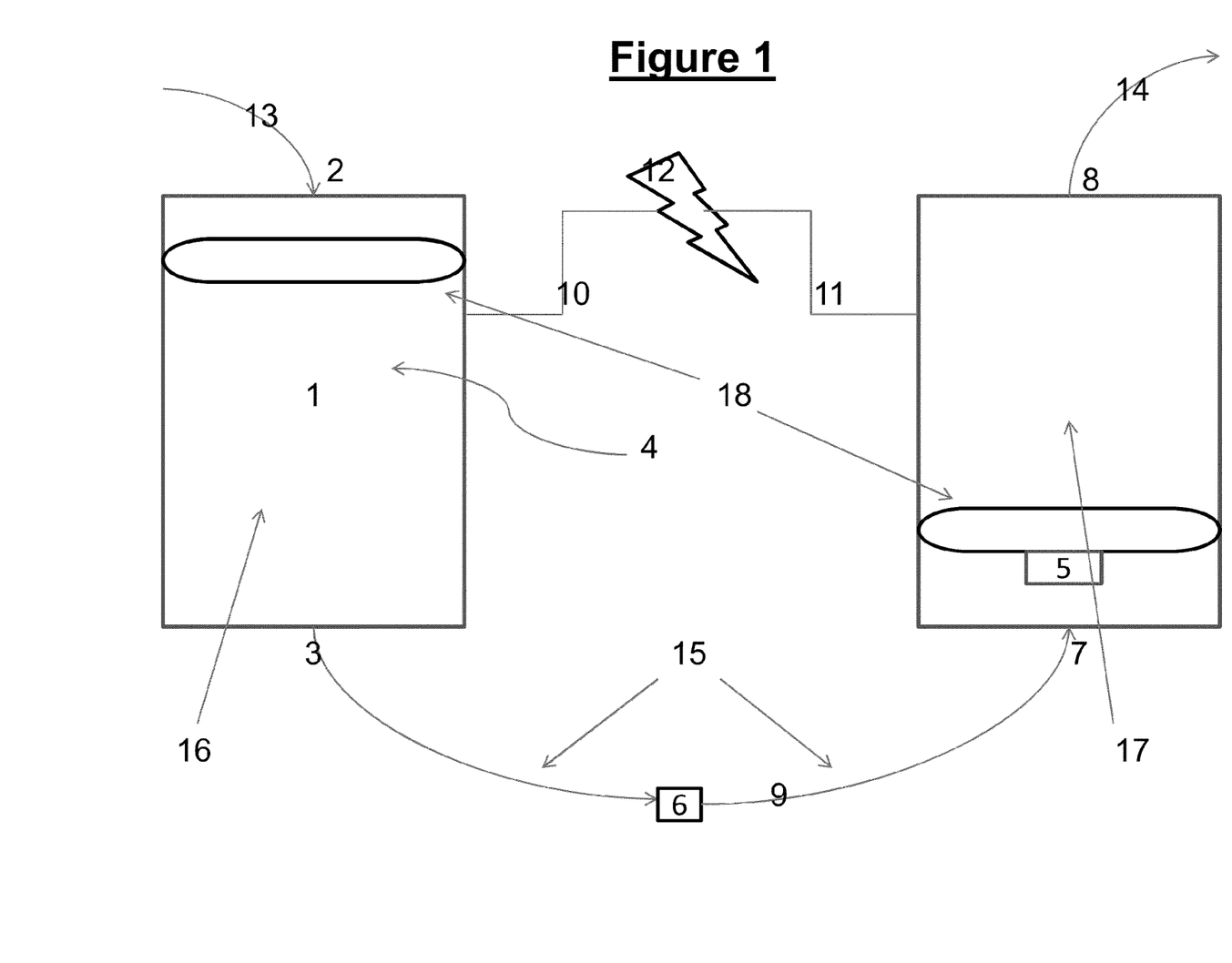
FIG. 1 is a diagram illustrating an exemplary microbial fuel cell in accordance with one embodiment of the microbial fuel cell described herein.

FIG. 1 is a diagram illustrating an exemplary membrane and barrier-free microbial fuel cell of the present invention. There is an anode 1, which has an anode inlet 2, an anode outlet 3, and fill 4. The fill can be, for example, spherical plastic beads coated in carbon ink, graphite particles—regular or irregular, or a graphite foil (or sheet). Other conductive, non-toxic materials may be used. Where graphite foils (at least 1 per module) are used, the rod (such as a PVC or metal rod, preferably not a material detrimental to the system by contributing toxicity to the system—noncylindrical rod shapes may be used, such as rectangular) may be 0.1" but preferably greater than 0.5", such as about 1" diameter (a greater diameter may be used based on the application with concomitant loss of surface area) with a spacer or stacking material attached to the graphite foil intended to cause a channel with preferably some tortuous path to mix the liquid and which will preferably flow through in a serpentine path through the rolls of the foil formed around the rod, increasing the contact surface and slowing the relative flow, which will promote biofilm growth. The foil may be rolled any number of times to practically fit in the module but the rolls should be designed to substantially fill the anode module space, allowing for even flow of the source water via the void space through the channels. A distributor may be used to distribute the source stream to evenly flow across the diameter of the anode module.

One suitable graphite foil is Pyro-Tex Joint Sealant from Slade, Inc., Statesville, N.C., which is 0.015" thick and 40" wide. The stacking material may be attached in a perpendicular orientation relative to the direction of rolling but may be varied to optimize mixing and/or the biofilm thickness and should be sufficiently raised to permit sufficient flow of the source water and biofilm growth. The stacking material is flexible in a preferred application or may be of fixed semicircular shape to permit rolling. The preferred final shape of the stacking material after rolling is adaptable to suit the application and may be semi-circular or semi-elliptical in nature such that a fluid pathway is formed for the source water to flow through. The goal is to design the baffling such that the source water is exposed to the greatest surface area while avoiding flow preventing obstructions. One suitable stacking material is Buna-N cord stock, such as the quad cross-section shape, which can be obtained from McMaster-Carr Supply Company.

In the cathode module, the fill can be, for example, spherical beads of a catalytic metal or metal coated material (such as silver, palladium, platinum, rhodium, copper) or a catalytic metal coated film, for example, silver, palladium, platinum, rhodium, or copper. The preferred coating is silver. Other coatings that are conductive and have some biocidal or antibiotic quality may preferably be used. Although not preferred, other conductive metal coatings may be used that do not have a biocidal or antibiotic quality. Such coating may be modified with catalytic surface active compounds. One suitable foil can be obtained from Techni-Met of Windsor, Conn., 3 mil SKC Skyrol SH31 substrate coated with 800 Angstroms Ag and is 40" wide. More preferably, the foil is coated on both sides. Air or some other oxygen containing gas contacts the charged source stream in the cathode module. The stacking material may also be less raised due to the lack of or significantly lesser biofilm (any such biofilm would be incidental and not preferred) in the cathode module, allowing for greater surface contact.

The microbial fuel cell of FIG. 1 has an anode module 16 and a cathode module 17. From both the anode and cathode module are the electrical contacts, anode 10 and cathode 11. The anode contact (e.g., foil, bead, wire, electrical tape) needs to not be toxic to the microbes and may be coated with a non-toxic material or be made of a conductive, non-toxic material. The cathode contact may be of any conductive material. The energy generated is collected at an energy management or collection device 12. The nutrient containing source stream 13 enters the anode module through the anode inlet 2 and flows over the distribution screen 18. Microbes culture in the anode module on the fill (not shown) and produce energy consuming BOD content of the source stream. The electron containing stream exits the anode module at the anode output and is transferred to the cathode module via the transfer tube 15. Optionally, a flow restrictor 6 may be used to prevent backflow of oxygen to the anode module. Alternatively, a one way valve or a number of other backflow prevention approaches may be used. The electron containing stream enters the cathode module, where it contacts a distributor 18. The stream is oxygenated for aerobic treatment in the cathode module. The cathode module preferably contains conductive spherical fill but may be other shapes that allow flow through the module and preferably limits channeling. More preferably the fill is a conductive foil rolled using stacking material, as described above. A most preferred conductive foil will also have biocidal or antibiotic properties and be corrosion resistant, such as silver. Alternatively, where spherical or other shaped bead or particle fill is used, baffles may be used in the module itself to help prevent channeling in both or either the anode or cathode module. Oxygen or air or some other suitable gas mixture (e.g., ozone) with sufficient oxygen is added or sparged into the flow to the cathode module and may be added upstream of the cathode inlet 7 but after the flow restrictor or backflow preventer 6 at addition point 9 and/or may be added within the cathode, preferably upstream of the distributor at point 5. The cleaned source water 14 exits the cathode module at the cathode outlet 8.

Figure 6:
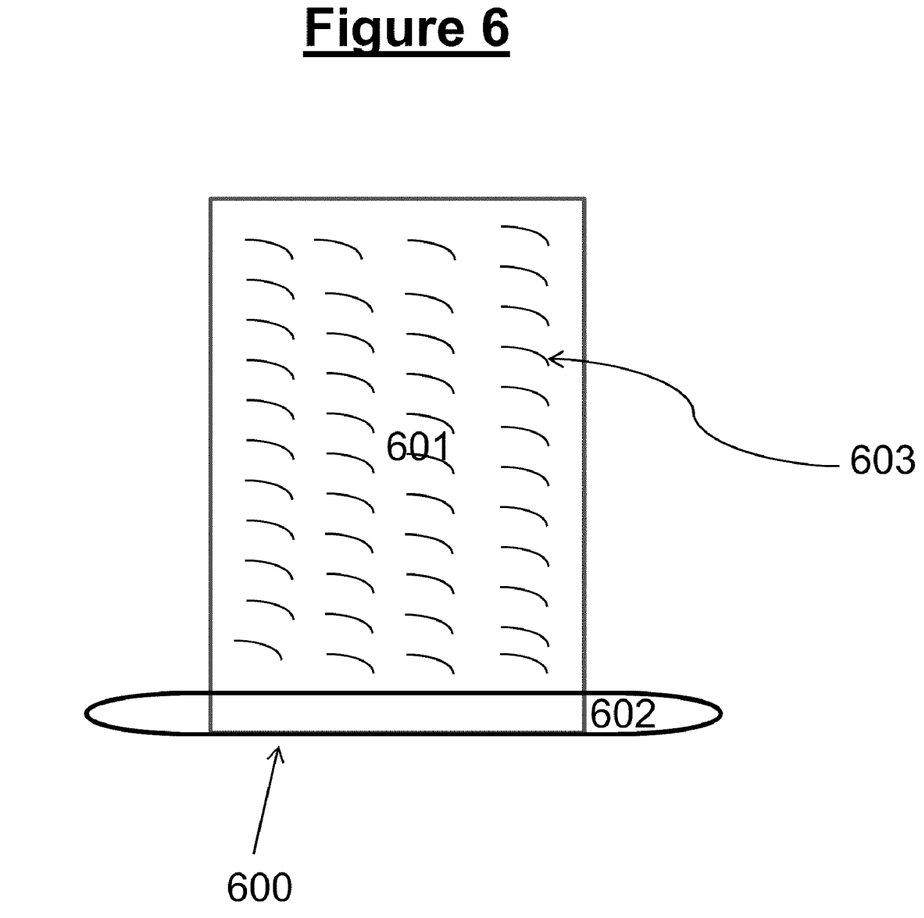
FIG. 6 depicts a rod and foil fill used in the anode and cathode modules.
Figure 7:
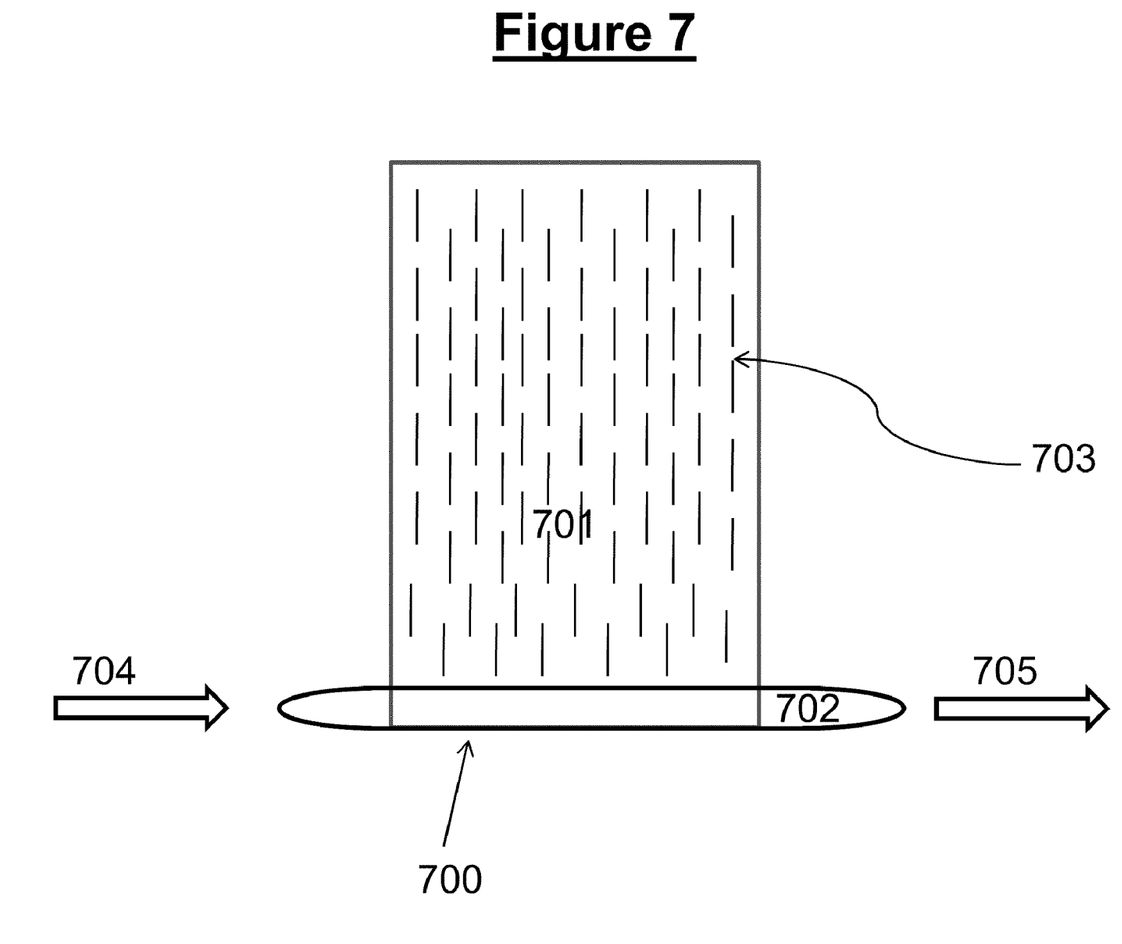
FIG. 7 depicts a rod and foil fill used in the anode and cathode modules.

In a preferred embodiment of the microbial fuel cell described above, the microbial fuel cell of FIG. 1 may use a film-based fill in either or both the anode module and cathode module. FIG. 6 depicts such a film rolled fill 600, which uses a foil or sheet 601 that is rolled on a rod 602 with prearranged and attached baffles 603, which can be designed to create a preferable flow and surface contact area. FIG. 7 depicts an alternate film rolled fill 700 with an alternative baffle design, where the baffles 703 on the foil 701 are closer together and designed such that when rolled on rod 702, the feedwater or source stream flow 704 is more likely to cause turbulent and tortuous flow, increasing the contact surface area. FIGS. 6 and 7 are depicted prior to rolling the film into a cylindrical rod with a diameter substantially similar to the anode or cathode module within which it will be inserted. The source stream will flow across the rod, through the rolled layers where the source stream will exit the module as effluent 705.

Figure 3:
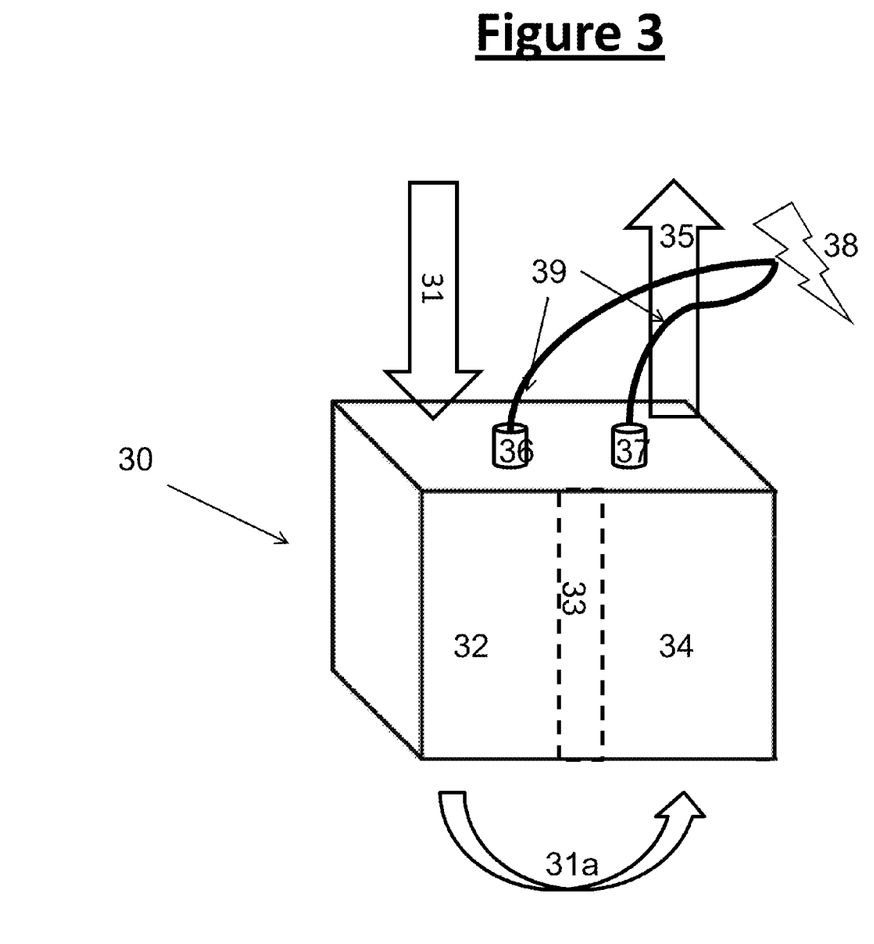
FIG. 3 illustrates an scalable module of a preferred embodiment.

Another embodiment is a membrane and barrier-free MFC that is flexibly scaled to the needed size by adding additional modules. FIG. 3 depicts an embodiment of such a module 30 where the size may be about one cubic meter (or about 158.5 gallons), for example, and such modules containing an anode module 32 and a cathode module 34, separated by a physical barrier 33 but where the effluent from the anode module 31a is the influent for the cathode module. Such modules may be configured to work in parallel and/or in series, depending on the target output goals of the particular user. A source stream, such as a wastewater effluent 31, at a flow rate of 100 gallons/hr, for example, could produce a continuous electrical power output of 5 kW, recovered by electrical connections to the anode 36 and cathode 37, which is then connected 39 to a means to recover the electric potential across the anode and cathode 38. By configuring the modules in parallel, the user could significantly reduce the COD/BOD in the effluent stream 35 to the level desired by the user. If a cleaner effluent is needed, the modules may be configured in series for example. Where such a configuration is used, the user may take advantage of knowing the quality of the subsequent effluent streams to configure the fill to optimize surface area to promote growth, energy production, and BOD reduction.

Figure 5:
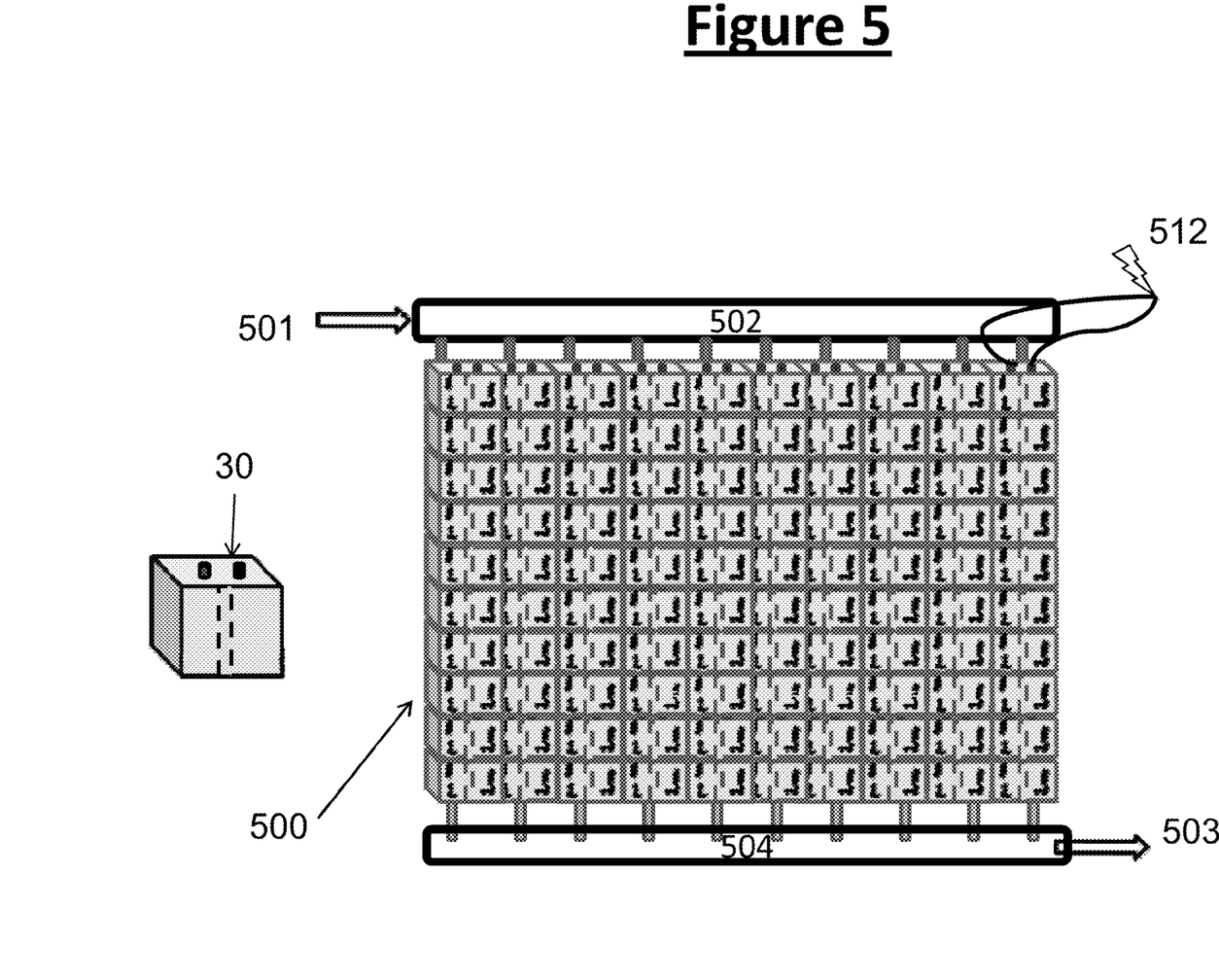
FIG. 5 illustrates the scalability of the present invention through the addition of modules.

FIG. 5 depicts a representation of a collection of such modules 30 in both series and parallel as a bank of MFC modules 500 that are configured to receive source stream 501 into an influent distributor bank 502. The cleaned effluent streams collect in an effluent distributor bank 504 to discharge the cleaned effluent 503. The collective energy generated is captured by a means 512 for use.

Alternatively, hydrogen can be recovered in another embodiment, in which oxygen would not be added to the cathode module and an electrical potential would be supplied to the system to effect the reaction.

Source streams of a sufficient BOD concentration, for example greater than 50 ppm, alternatively greater than 150 ppm, alternatively greater than 300 ppm, greater than 500 ppm, more preferably greater than 1000 ppm is introduced into the anode module of the microbial fuel cell and discharged at a portion of the cathode module after passing through the anode module and transferred to the cathode module. Optionally, the source stream passes through a flow restrictor, unidirectional pump, or a backflow preventer. The source stream may be sampled or otherwise monitored at some point after the anode module to measure the BOD and/or COD to determine the treatment efficiency regarding organic substances. The quantity of electric charge is calculated by integrating the electric current generated over time. The result is analyzed for correlation to organic substances removed from the cell, in order to determine electricity generation efficiency. The flow may be adjusted or other adjustments may be made in response to maintain and/or optimize the system.

According to a preferred embodiment, it is important that oxygen is sufficiently fed to a cathode module since oxygen supply is a rate-controlling factor. It has been found that air contains sufficient oxygen, though in some applications, it may be preferable to feed a higher concentration of oxygen to ensure optimal operation.

According to a preferred embodiment, the electrode used in a cathode module may be made of or coated with conductive, biocidal materials, such as copper, silver, or platinum. Silver has been used as a preferred material.

According to a preferred embodiment, a device having a type represented in FIG. 1 is used to treat source water continuously. Source water may be kept in a reservoir may be introduced into an upper portion of the anode module, either through pumping or gravity flow. Alternatively, the source water may be introduced into a lower portion of the anode module of the microbial fuel cell by means of a flow control pump. While source water is flowing through the anode module, organic substances present in the source water are anaerobically digested by microorganisms, thus resulting in the generation of electrons. These electrons are transferred to the anode and protons are transferred to the cathode through aerobic reaction, without passing through an external barrier such as glass wool or beads. Under the premise that the maximum transfer rate to the cathode module is equal to the decomposition rate of the aforesaid organic substances in the anode module, sufficient air is fed to the cathode module to ensure the maximum potential is achieved.

A microbial fuel cell according to the present invention can be operated without using an expensive cation-exchange membrane or similar glass wool or glass bead barrier or interface between the cathode and anode with an expectation of greater efficiency by limiting fouling. Moreover, a membrane-less microbial fuel cell of the present invention has further advantages in that source stream primarily treated in an anode module can be used as an electrolyte in a cathode module. Therefore, a special electrolyte does not necessarily have to be utilized in the cathode module. In addition, the source water is aerobically treated in the cathode module or where hydrogen is sought, air or oxygen is not added to the cathode module.

In an alternative embodiment particulate fill in the anode module may be stratified by size with a larger size where the source water first enters the module to increase interstitial spacing for flow purposes and may decrease by gradients to the outlet of the anode module.

Where the embodiment uses a foil module fill, the baffling or channeling can be customized and designed to the application. For example, a high solids source stream or a source stream containing large particles may utilize a larger baffle to allow more space between rolls. The baffling may also be more spread out to prevent plugging of channels. Moreover, it has been found that such baffling offers an unexpected advantage over fill materials such as beads or felt, where flow characteristics may be controlled. For example, in the cathode module, turbulent flow characteristics may be preferable while in the anode module, non-turbulent flow is preferable.

The following examples are presented to provide a more detailed understanding of the invention. They are for illustrative purposes only and are not to be taken as limitative.

Example 1

In determining the BOD reduction efficacy, a sample of dairy effluent water (feedwater) was taken at T1 at the point of entry into the anode of the microbial fuel cell. At time T2 a second sample was taken at the effluent of the cathode of the microbial fuel cell, where T2−T1=the residence time of the microbial fuel cell. The biochemical oxygen demand of the source steam was measured to be 2470 mg/l and the biochemical oxygen demand of the effluent from the microbial fuel cell was measured to be 1400 mg/l. A 43.3% BOD reduction was realized by treatment of the source stream by a membrane-free, barrier-free microbial fuel cell corresponding to an embodiment of the microbial fuel cell described in this specification using a graphite foil in the anode and a silver-coated foil in the cathode. The silver-coated foil was 3 mil SKC Skyrol SH31 substrate coated with 800 Angstroms Ag and the graphite foil in the anode was 0.015" thick Pyro-Tex Joint Sealant from Slade, Inc. The surface area of the graphite foil was 14 ft$^2$. The volume of the anode module was 3.293 liters. The flow was continuous at a rate of 107.99 ml/min. The residence time in the anode module was 30.49 minutes. The surface area of the silver-coated foil in the cathode module was 35 ft$^2$. The volume of the cathode module was 6.170 liters. The flow rate was 107.99 ml/min and the residence time in the cathode module was 57.14 minutes. A flow pump was used, such continuous flow prevented backflow of oxygen from the cathode to the anode.

Example 2

Dairy wastewater was fed from a 275 gallon tank as a source stream at a rate of 4 ml/min, generating a voltage of up to 1.13V over a period of about 10 days, previously a voltage of up to about 18V was recorded. During the 10 day period mentioned above, the average voltage recorded through a Keithley 614 electrometer was 0.63V, with a low voltage of 0.51V. The fill used in the anode was a rolled graphite foil and in the cathode ¼" propylene balls coated with Creative Materials #124-46 silver conductive ink were used. The air flow at times was 120 ml/min. The results show that microorganisms in an anode module have the capacity to generate and carry an electric charge to the cathode and an electric charge can be generated across the anode and cathode.

Figure 2:
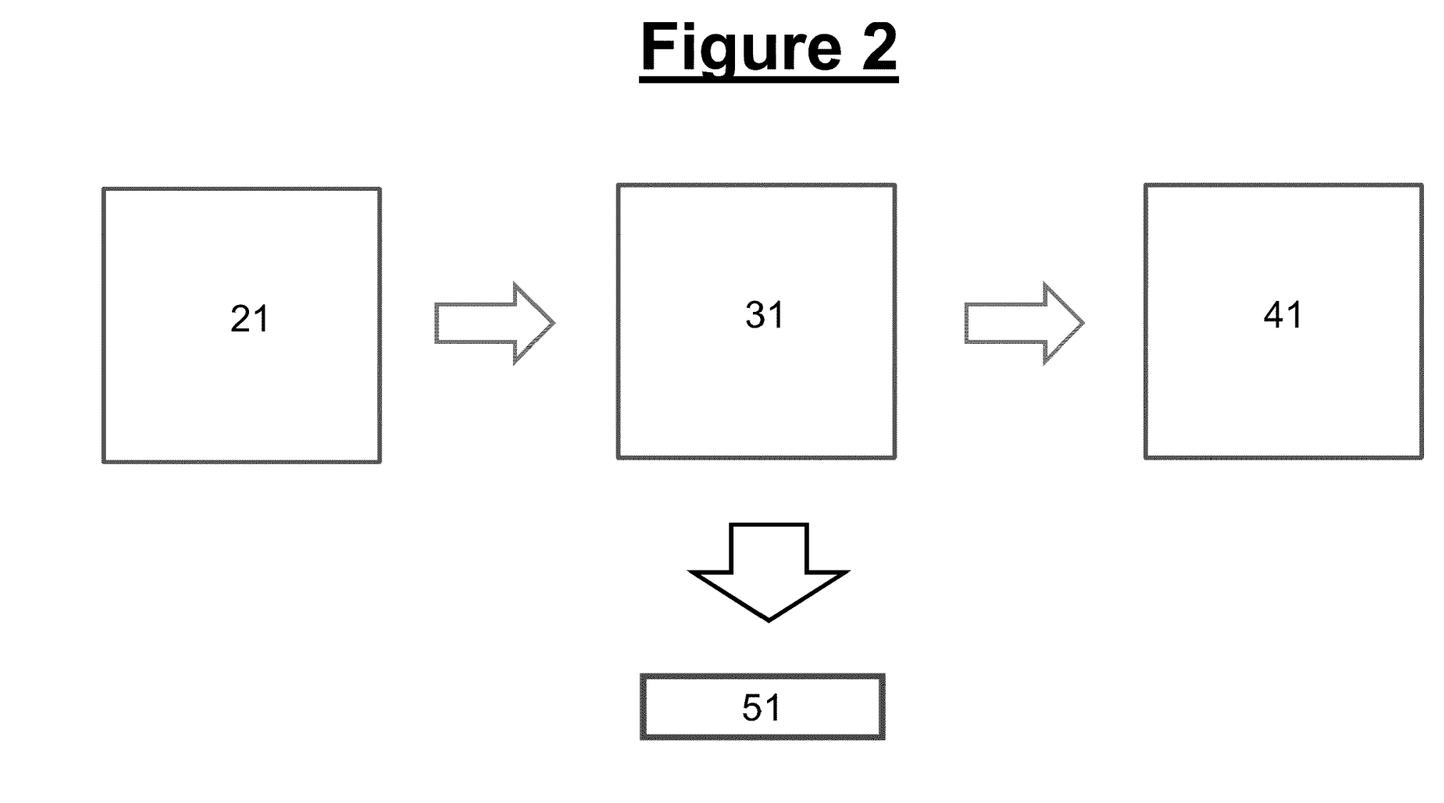
FIG. 2 illustrates how the MFCs described in the specification addresses manufacturing effluent and energy issues.

The concepts and embodiments disclosed herein can be applied over a broad scope of industries and with a variety of source streams. Examples of preferred feedwater streams are from food and beverage processing, agriculture, wood and pulp processing, and municipal wastewater treatment. More specific examples include dairies, poultry, pig farms, cattle farms, fruit and vegetable processors, corn ethanol production, pet food producers, sugar product producers, and the like. The general approach described herein can be used to treat anoxic waters, or dead zone water regions. Conceptually, FIG. 2 is a depiction of benefits of a MFC. The wastewater from a manufacturing plant 21 could also be any nutrient rich feedwater, that flows into a MFC 31, producing cleaner water 41 and electricity or hydrogen 51.

Figure 4:
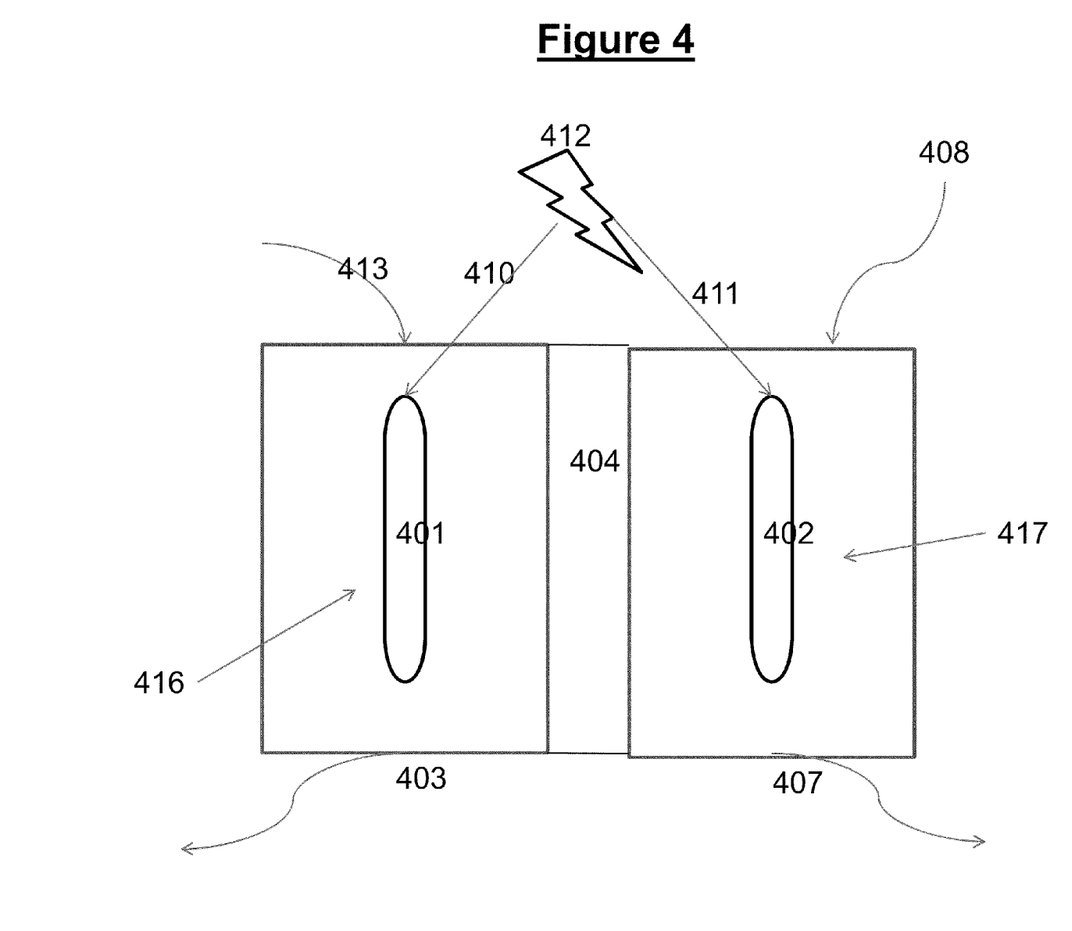
FIG. 4 illustrates a depiction of a membrane using MFC.

It is not difficult to see that the simplicity of the design allows for scalability without worry of membrane issues, as found in membrane using MFCs. FIG. 4 is a depiction of a membrane MFC, where 404 is the membrane connecting the anode chamber 416 and the cathode chamber 417. A biofilm deposits on the anode 401 under anaerobic conditions and the microbes consuming the nutrients in the feedwater 413 generate energy and the effluent 403 will typically exhibit a reduced BOD/COD. The cathode 402 operates under aerobic conditions with both water and air entering 408 and exiting 407 the cathode chamber. The potential is created over a cation-exchange membrane 404, which is subject to limitations such as fouling and introduces significant costs. A means 412 is used to then capture the energy potential across the membrane through connections to the anode 410 and cathode 411. With each module, a distinct membrane is required and each membrane is subject to failure and fouling, making scalability undesirable due to the maintenance issues and costs. By eliminating the membrane in the embodiments described herein, the disadvantages and problems with using a membrane are eliminated.

While the preferred embodiments have been described herein, variations and modifications within the scope of what would be known to one of skill in the art are possible without deviating from the broad principles of the invention, for example, a biocidal treatment zone, such as an ozone and/or ultraviolet light zone, may be added to the embodiments to further treat the effluent water.

What is claimed is:

1. A method for reducing biological oxygen demand in water using a membrane-less and barrier-less microbial fuel cell comprising a cathode module, an anode module, a means for feeding source water from the anode module to the cathode module, and a means for introducing oxygen into said cathode module, wherein said source water is introduced into said anode module and discharged from said cathode module and wherein air is introduced to the source water after said anode module.

2. The method of claim 1, wherein said source water is fed continuously.

3. The method of claim 1, wherein two or more fuel cells are used in conjunction with said source water.

4. The method of claim 3, wherein said fuel cells are in parallel.

5. The method of claim 3, wherein said fuel cells are in series.

6. The method of claim 1, wherein a potential is formed across the anode and cathode modules.

7. The method of claim 1, the anode module comprising a fill, wherein the fill used in the anode module comprises at least one rolled graphite foil.

8. The microbial fuel cell of claim 7, the cathode module comprising a fill, wherein the fill used in the cathode module comprises at least one rolled silver foil and where both the anode and cathode rolled foil fill further comprises stacking material attached to at least one side of both said foils.

9. The method of claim 1, the cathode module comprising a fill, wherein the fill used in the cathode module comprises at least one rolled silver foil.

* * * * *